United States Patent [19]
Speckhart et al.

[11] Patent Number: 5,657,851
[45] Date of Patent: Aug. 19, 1997

[54] POWERED STORAGE RAIL FOR TRANSPORTING ARTICLES

[75] Inventors: Bernard S. Speckhart, Short Hills, N.J.; Eric Offenbacher, Peekskill, N.Y.; Ramon R. Duterte, Jr., Lodi, N.J.

[73] Assignee: White Conveyors, Inc., Kenilworth, N.J.

[21] Appl. No.: 504,269

[22] Filed: Jul. 19, 1995

[51] Int. Cl.⁶ .................................................. B65G 17/20
[52] U.S. Cl. ................................. 198/465.4; 198/678.1
[58] Field of Search .................. 198/464.2, 465.4, 198/576, 358, 832.1, 678.1

[56] References Cited

U.S. PATENT DOCUMENTS

| | | | |
|---|---|---|---|
| Re. 24,961 | 4/1961 | Curtis | 118/316 |
| 421,999 | 2/1890 | Williams . | |
| 1,412,631 | 4/1922 | Righter . | |
| 1,861,600 | 6/1932 | Harrison . | |
| 1,998,109 | 4/1935 | Walter, Jr. | 211/1.5 |
| 2,449,669 | 9/1948 | Pohlers | 198/168 |
| 2,536,575 | 1/1951 | Seldin | 198/168 |
| 2,573,334 | 10/1951 | Hitz | 198/173 |
| 2,583,968 | 1/1952 | Rosseau | 263/6 |
| 2,599,615 | 6/1952 | Dahlberg | 198/213 |
| 2,645,186 | 7/1953 | Davis | 104/97 |
| 2,708,501 | 5/1955 | Boehm | 198/27 |
| 2,750,897 | 6/1956 | Davis | 104/96 |
| 2,751,091 | 6/1956 | Freeman | 214/11 |
| 2,846,049 | 8/1958 | Carlson | 198/130 |
| 2,861,676 | 11/1958 | Rasmussen et al. | 198/218 |
| 2,868,354 | 1/1959 | Harrison | 198/177 |
| 2,899,072 | 8/1959 | Weiss | 211/1.5 |
| 2,916,132 | 12/1959 | Leiser | 198/21 |
| 2,918,164 | 12/1959 | Austin et al. | 198/177 |
| 2,947,407 | 8/1960 | Wood | 198/66 |
| 2,952,351 | 9/1960 | Stone | 198/177 |
| 2,987,170 | 6/1961 | Hamilton | 198/213 |
| 2,998,136 | 8/1961 | Gerisch | 209/81 |

(List continued on next page.)

FOREIGN PATENT DOCUMENTS

| | | | |
|---|---|---|---|
| 334127 | 7/1933 | Canada . | |
| 690778 | 7/1964 | Canada | 186/11 |
| 726529 | 1/1966 | Canada | 198/22 |
| 1018931 | 10/1977 | Canada | 203/18 |
| 1018472 | 10/1977 | Canada | 203/18 |
| 0492465 | 7/1992 | European Pat. Off. | 198/465.4 |
| 1140139 | 11/1962 | Germany . | |
| 1205448 | 11/1965 | Germany . | |
| 2419639 | 1/1975 | Germany | 198/465.4 |
| 2525070 | 12/1976 | Germany . | |
| 3822838 | 1/1990 | Germany | 198/465.4 |
| 737325 | 6/1980 | U.S.S.R. . | |
| 1221112 | 3/1986 | U.S.S.R. . | |

OTHER PUBLICATIONS

Master–Veyor brochure, published by Speed Check Conveyor Co. Inc. Decatur, GA, pp. 1–4.
Sorting Carousel brochure, published by Dunnewolt U.S.A. Inc., Dallas, TX, pp.1–4.
My–T–Veyor brochure, Model No. 830, published by My–T–Veyor, Oxford, MI, pp.1–3.
Sort–O–Veyor brochure, published by Speed Check Conveyor Co. Inc. Decatur, GA, pp. 1–4.
Quick Assembly brochure, published by Natmar, Inc., Cincinnati, Ohio, pp.1–2.
Controlling Hospital Garments, Wim Giezeman, Textile Rental, Jun. 1982, pp. 34–36, 38.

*Primary Examiner*—James R. Bidwell
*Attorney, Agent, or Firm*—Kenyon & Kenyon

[57] ABSTRACT

A computer controlled powered storage rail for use as a bridge between conveyor systems comprises a motor driven chain that is shaped to receive hangers bearing articles of clothing from a first conveyor, and transports them to a second conveyor. A hanger metering device located between the rail and the second conveyor enables the hangers to be fed to the second conveyor singly, and a control system provides that this occurs only when a suitable space is available on the second conveyor for receipt of the hanger. The rail itself may further serve as a temporary storage buffer for articles in transit between conveyors.

25 Claims, 9 Drawing Sheets

U.S. PATENT DOCUMENTS

| | | | |
|---|---|---|---|
| 3,008,562 | 11/1961 | Ohrnell | 198/26 |
| 3,017,025 | 1/1962 | Stephen | 209/81 |
| 3,090,481 | 5/1963 | Biel et al. | 198/221 |
| 3,113,659 | 12/1963 | Oda et al. | 198/25 |
| 3,124,236 | 3/1964 | Gerisch | 198/169 |
| 3,148,765 | 9/1964 | Weiss et al. | 198/213 |
| 3,151,730 | 10/1964 | Bünten | 198/38 |
| 3,152,682 | 10/1964 | Rutkovsky et al. | 198/38 |
| 3,164,245 | 1/1965 | Juengel | 198/129 |
| 3,171,536 | 3/1965 | Johnson | 198/465.4 |
| 3,178,012 | 4/1965 | Weiss et al. | 198/213 |
| 3,184,042 | 5/1965 | Rutkovsky et al. | 198/177 |
| 3,194,383 | 7/1965 | Kuwertz | 198/38 |
| 3,200,933 | 8/1965 | Schenk et al. | 198/38 |
| 3,247,952 | 4/1966 | Kozlosky | 198/173 |
| 3,403,767 | 10/1968 | Gerisch | 198/20 |
| 3,415,352 | 12/1968 | Gerisch | 198/38 |
| 3,557,935 | 1/1971 | Gerisch | 198/38 |
| 3,580,378 | 5/1971 | Pedersen | 198/25 |
| 3,581,887 | 6/1971 | Radutsky et al. | 209/73 |
| 3,622,000 | 11/1971 | McClenny | 209/121 |
| 3,684,078 | 8/1972 | Nielsen | 198/33 |
| 3,707,925 | 1/1973 | Byrnes, Sr. | 104/167 |
| 3,780,852 | 12/1973 | Speckhart et al. | 198/181 |
| 3,786,911 | 1/1974 | Milazzo | 198/219 |
| 3,799,318 | 3/1974 | Dekoekkoek | 198/26 |
| 3,860,351 | 1/1975 | Weiss et al. | 403/218 |
| 3,917,112 | 11/1975 | Willis et al. | 221/1 |
| 3,942,340 | 3/1976 | Kirkby | 68/3 R |
| 3,961,699 | 6/1976 | Hirsch | 198/26 |
| 4,018,327 | 4/1977 | Goodman et al. | 198/723 |
| 4,022,338 | 5/1977 | Laursen | 214/89 |
| 4,027,598 | 6/1977 | Swilley | 104/162 |
| 4,036,365 | 7/1977 | Rosenfeld | 209/73 |
| 4,180,152 | 12/1979 | Sefcik | 198/377 |
| 4,214,663 | 7/1980 | Schopp et al. | 209/552 |
| 4,239,435 | 12/1980 | Weiss et al. | 414/136 |
| 4,303,503 | 12/1981 | de Mimerand et al. | 209/3.3 |
| 4,763,773 | 8/1988 | Kawarabashi et al. | 198/409 |
| 4,817,778 | 4/1989 | Davidson | 198/346.1 |
| 4,875,416 | 10/1989 | Duce | 104/167 |
| 4,903,819 | 2/1990 | Heinold et al. | 198/465.4 |
| 4,907,699 | 3/1990 | Butcher et al. | 209/3.3 |
| 4,943,198 | 7/1990 | McCabe | 414/13 |
| 4,977,996 | 12/1990 | Duce | 198/349.95 |
| 4,991,719 | 2/1991 | Butcher et al. | 209/3.3 |
| 4,995,531 | 2/1991 | Summers | 221/75 |
| 5,000,309 | 3/1991 | Dooley | 198/680 |
| 5,005,691 | 4/1991 | Jennewein et al. | 198/465 |
| 5,113,995 | 5/1992 | Sakurai | 198/409 |
| 5,125,513 | 6/1992 | Branch | 198/465.4 |
| 5,141,094 | 8/1992 | Speckhart et al. | 198/349 |
| 5,143,201 | 9/1992 | Speckhart et al. | 198/502.3 |
| 5,154,275 | 10/1992 | Speckhart et al. | 198/416 |
| 5,193,686 | 3/1993 | Speckhart et al. | 209/3.3 |
| 5,220,511 | 6/1993 | Speckhart et al. | 364/478 |
| 5,269,402 | 12/1993 | Speckhart et al. | 198/416 |
| 5,299,134 | 3/1994 | Speckhart et al. | 364/478 |
| 5,351,803 | 10/1994 | Speckhart et al. | 198/464.3 |
| 5,451,234 | 9/1995 | Wassermann | 606/203 |

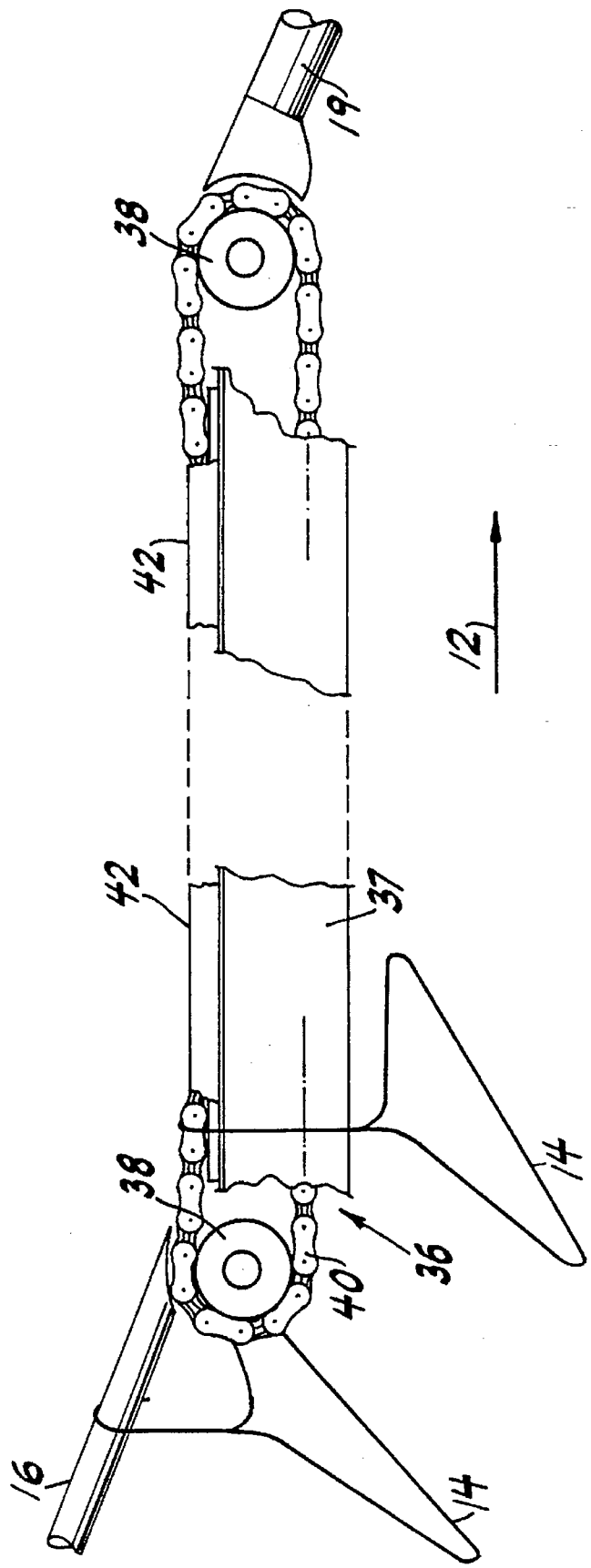

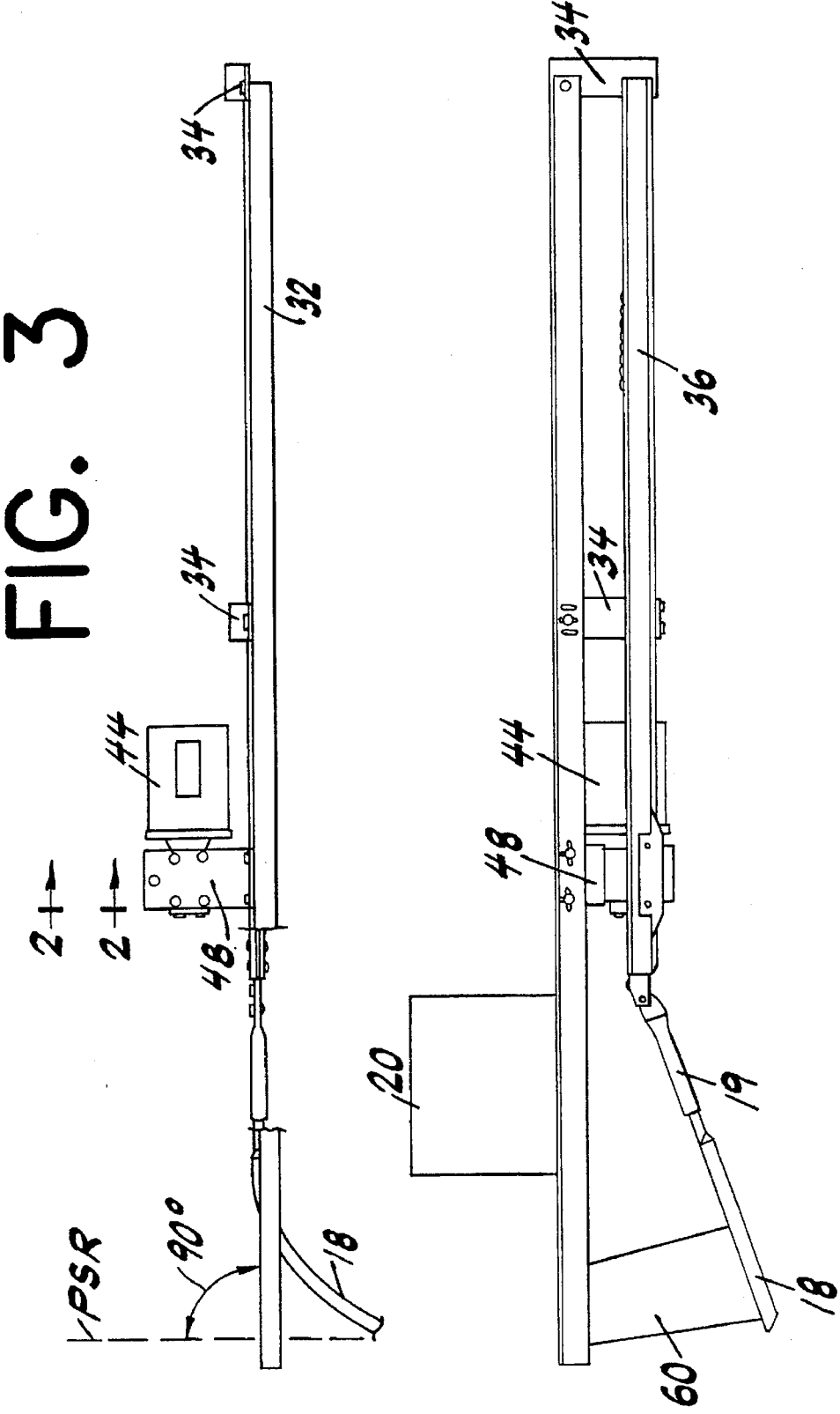

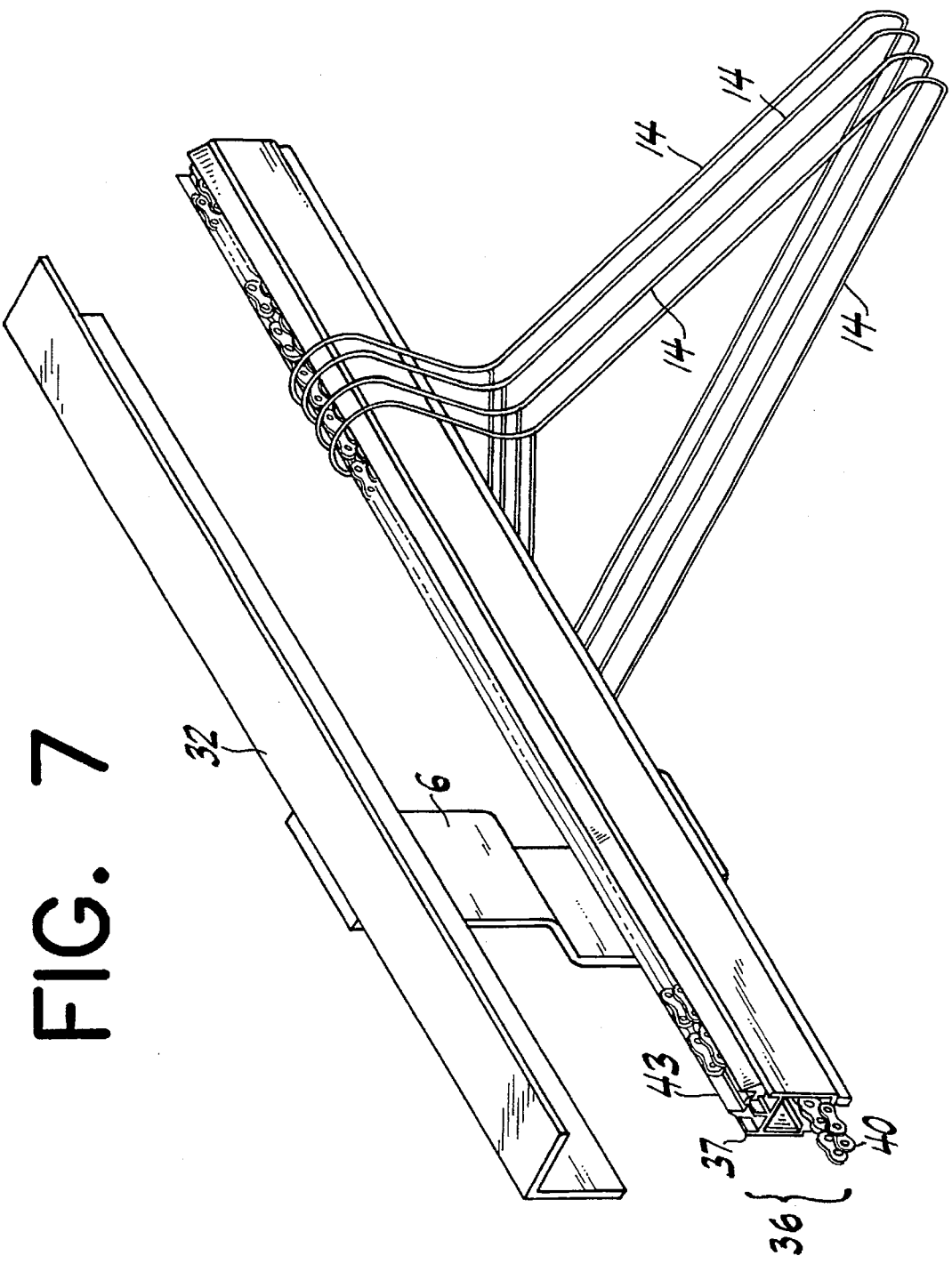

POWERED STORAGE RAIL FOR TRANSPORTING ARTICLES

FIELD OF THE INVENTION

The present invention relates generally to an apparatus and method for conveying articles and, in particular, to an apparatus for conveying articles in a targeted manner from a first conveyor to a second conveyor.

BACKGROUND OF THE INVENTION

Apparatus for conveying articles and, in particular, articles supported on hooked members, are used in various industries. For example, articles conveyed in an assembly line are frequently supported on hooked members, wherein the hooked members are carried by a conveyor so that the articles can be used or worked on in the assembly line.

An important application of such systems is to be found in laundry and dry cleaning facilities, where the hooked members are hangers and the articles are garments supported on the hangers. In one proposed system, several hundred garments are placed on hangers and loaded onto a first sorting conveyor, where a pre-sort is done. The garments are then transferred to a second conveyor where a final sort is carried out.

The position of each garment on the sorting conveyor can be registered in a computer. The computer can then be used to prepare a specific sorting sequence for delivering the garments into the respective drop-off stations.

There are several drop-off stations located at various points along the sorting conveyor which are adapted to receive the garments prior to delivery to the customers. The garments are sorted by moving the sorting conveyors and by delivering each garment into a predetermined drop-off station. The sorted garments located at one or more drop-off stations are loaded into trucks for delivery to the customers.

Aspects of the design of conveyor systems, including sorting techniques, conveyor structure, and apparatus for loading and unloading articles onto and off of each conveyor are presented in the following U.S. patents assigned to the assignee of the instant invention. The entire contents of each of these patents is hereby expressly incorporated by reference herein, particularly for the aspects noted: U.S. Pat. No. 5,141,094, which teaches apparatus for unloading articles; U.S. Pat. No. 4,239,435, which provides teachings pertaining to the distribution of a randomly assorted group of articles; U.S. Pat. No. 5,143,201, which teaches a carrier assembly; U.S. Pat. No. 5,351,803, which teaches a device and method for retrieving articles; U.S. Pat. No. 5,269,402, which teaches a conveyor; U.S. Pat. No. 5,299,134, which teaches a computer control system; U.S. Pat. No. 5,193,686, which teaches article loading apparatus; U.S. Pat. No. 5,154,275, which teaches a conveyor; and U.S. Pat. No. 5,220,511, which teaches a computer control system for sorting articles. Still further details of a conveyor and computer control system for use with the instant invention are set forth in copending U.S. patent applications entitled "CONVEYOR SYSTEM WITH A COMPUTER CONTROLLED FIRST SORT CONVEYOR" and "SINGLE LATCH LOADER AND METHOD FOR LOADING", filed on even date herewith, and which are assigned to the same assignee as is the present invention, and which are hereby expressly incorporated by reference in their entirety herein.

The use of multiple conveyors to effect a multi-layered sort of articles is a more efficient means of providing the end user (typically a delivery truck on a fixed route) with a more fully sorted group of articles. The implementation of this strategy requires a means for transferring articles from one conveyor to another. The conveyors employed (and described in the aforecited patents) utilize computers to identify each article, and track its position as it progresses through the system. It is therefore necessary that the means for transferring articles from a first conveyor to a second conveyor respect the order in which the garments are released from one of the conveyors for additional sorting by another of the conveyors.

The second of the conveyors presents a number of spaces for accommodating articles from the first conveyor. Due to the nature of sorting, available spaces are not necessarily located in adjacent positions on the conveyor, and in any event may not be immediately available. It may, therefore, be necessary to provide a buffer space to temporarily accommodate a number of articles before they are transferred to an available space on the second conveyor. Hence, there is a need for means for transferring articles of clothing from a first conveyor to a second conveyor that also provides for a buffer space in which to store garments

SUMMARY OF THE INVENTION

The powered storage rail of the instant invention is used to horizontally transfer garments on hangers from one conveyor to another. Its design allows these garments to be stored, if necessary, prior to being loaded onto the second conveyor. The powered storage rail is used in conjunction with a hanger metering device to provide a controlled means of transferring garments to the specific locations within the second conveyor at specific times for subsequent handling.

The powered storage rail of the instant invention comprises a straight track that can both transport and store garments on hangers. A continuous loop of roller chain rides in a plastic guide which is mounted on an extruded aluminum rail. The roller chain travels around sprockets located at both ends of the rail. The chain is driven by one of these sprockets, which is attached to a gearbox/motor arrangement. Power to the powered storage rail motor is switched on and off in a controlled manner. The motor turns the gearbox and sprocket, thereby advancing the chain in an incremental manner. Deenergizing the motor stops the advance of the chain.

A control unit governs the operation of the powered storage rail. It processes input from various sensors monitoring the movement of hangers to implement control functions such as sequencing, counting and timing to provide for the off-loading of articles from the rail at appropriate times. The control unit employed can be of the analog type, such as a conventional electrical circuit made up of relays, timers and counters, or a more sophisticated computer-based system.

A hanger metering device employed at the output side of the powered storage rail creates a local queue between the storage rail and the adjacent conveyor. The hanger metering device allows a group of hangers to be loaded into a queue from the powered storage rail, and releases the hangers from the queue for further movement to the second conveyor in a controlled manner, one hanger at a time.

BRIEF DESCRIPTION OF THE DRAWINGS

For a more complete understanding of this invention, reference should now be made to the embodiments illustrated in greater detail in the accompanying drawings and described below. In the drawings:

FIG. 2 is a partially cut-away schematic side view of a portion of the powered storage rail shown in FIG. 1;

FIG. 3 is a top view of the powered storage rail;

FIG. 4 is a side view of the powered storage rail shown in FIG. 3;

FIG. 7 is a partial perspective view of the-powered storage rail;

DETAILED DESCRIPTION

Figure 1:
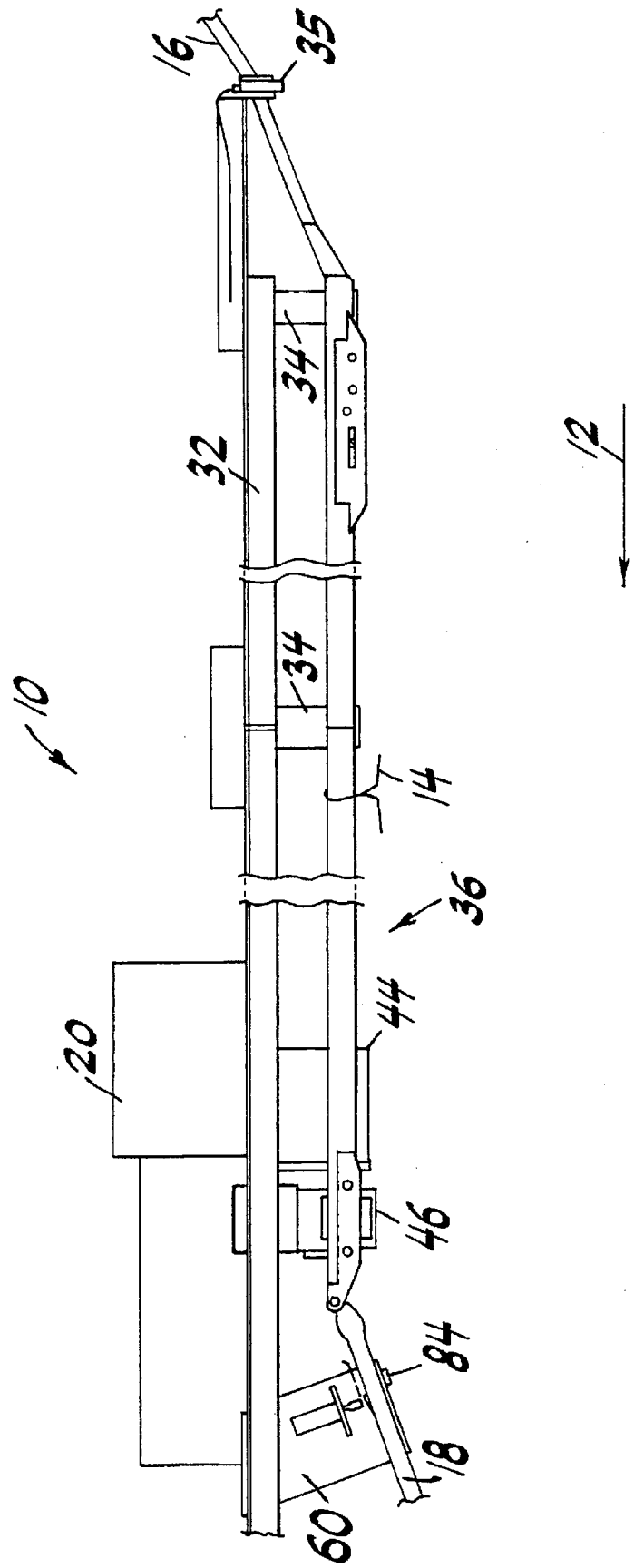
FIG. 1 is a side view of a powered storage rail constructed according to the principles of the invention.

Referring now to the drawings, wherein like numerals indicate like parts throughout, a powered storage rail (PSR) constructed according to the principles of the invention is generally designated 10 in FIG. 1, and comprises an upper mounting bracket 32, a load rail 16 for receiving articles (typically hangers) from a first conveyor, a drive assembly 36, a PSR drive motor 44, and a hanger metering assembly ("singulator") 60. In the preferred embodiment, a control unit 20 provides computer control over the operation of the apparatus, as will be explained below.

Figure 6:
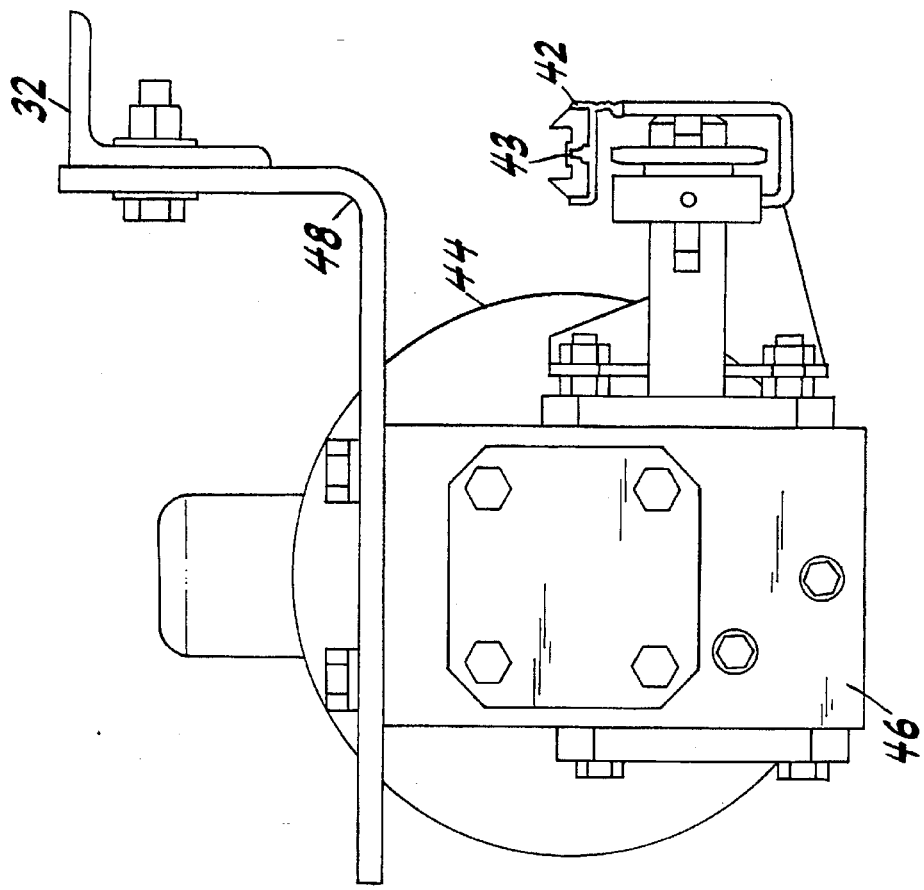
FIG. 6 is an end view taken along line 2—2 of FIG. 3, showing the motor and related drive elements of the powered storage rail.
Figure 5:
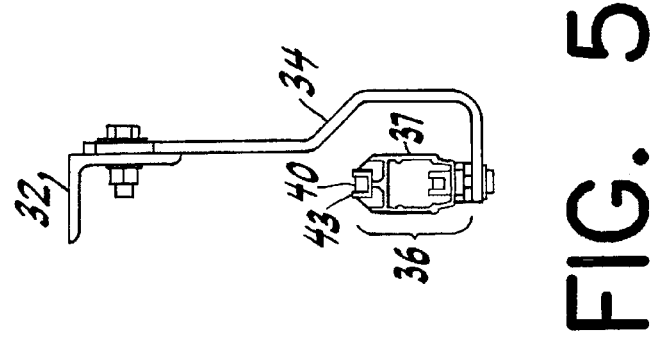
FIG. 5 is a sectional end view of the powered storage rail shown in FIG. 4.
Figure 8:
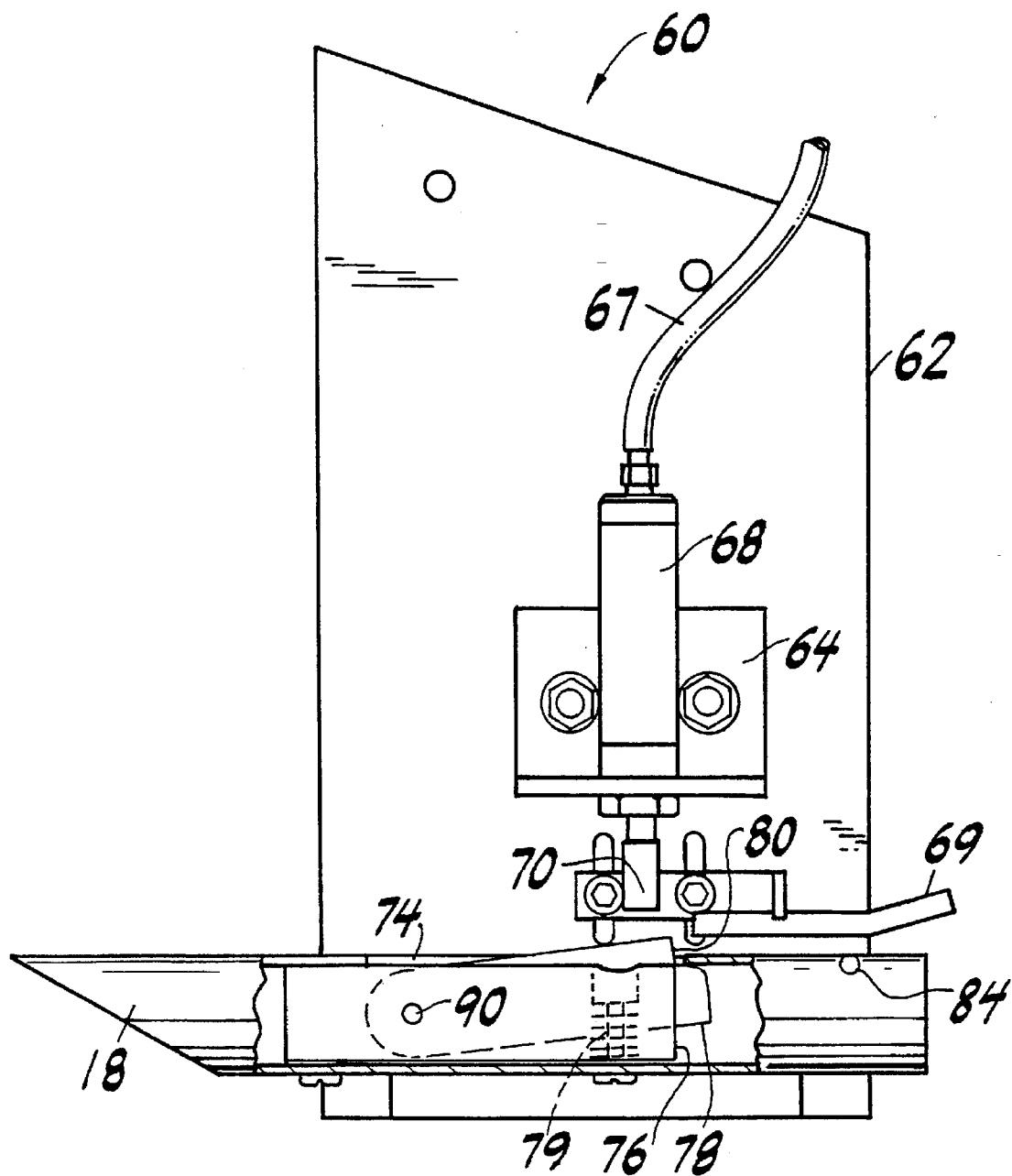
FIG. 8 is a front view, partially in section, of a hanger metering device constructed according to the principles of the invention.
Figure 9:
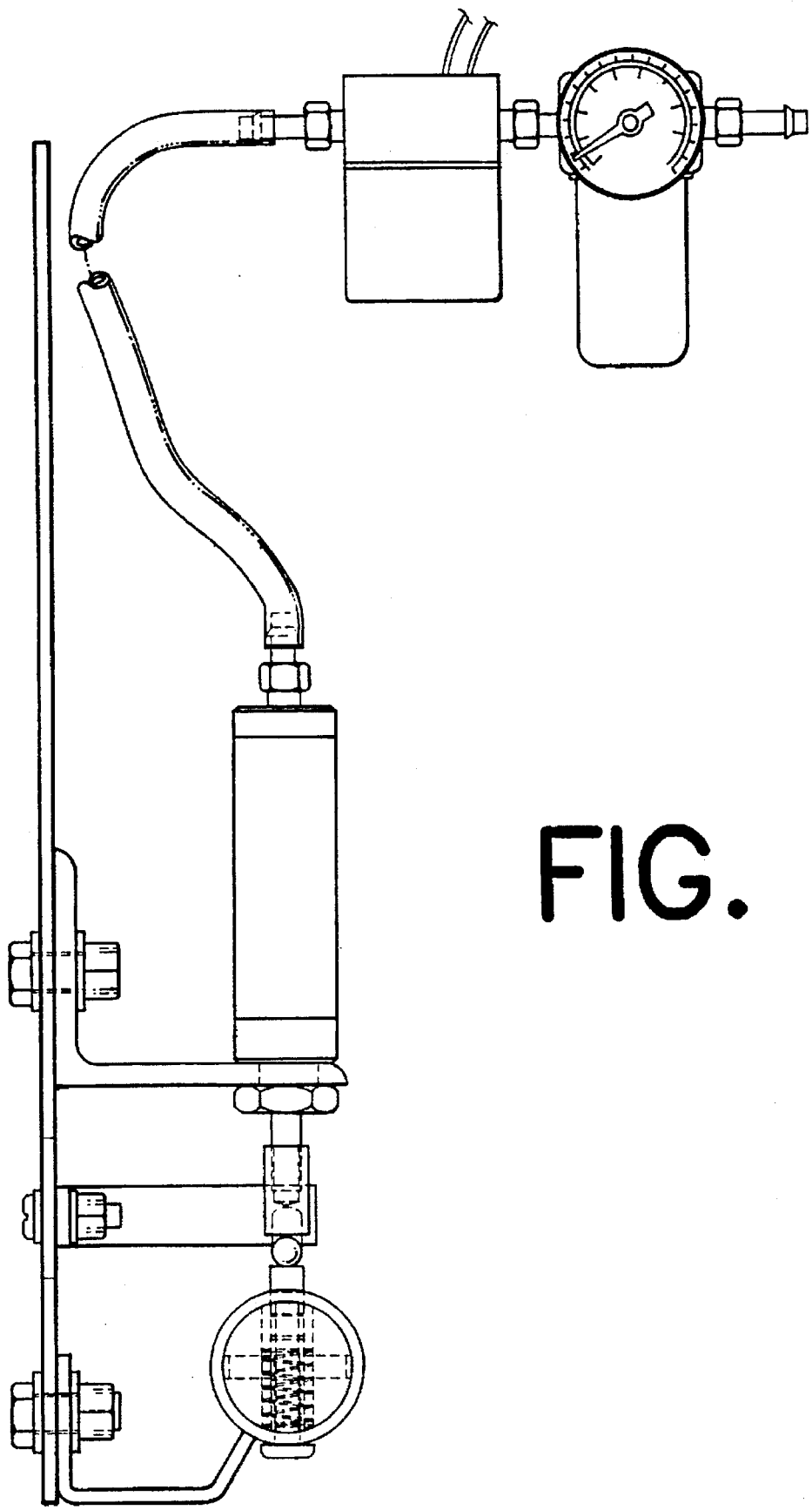
FIG. 9 is a side view of the hanger metering device shown in FIG. 8.

The drive assembly 36 of the rail comprises a steel roller chain 40 that is entrained by two pulleys 38 mounted within a drive housing 37 (see FIGS. 2 and 7). The chain 40 is made of links that have a "FIG. 8"-like appearance, with concave central portions that help provide suitable drive contact with the hooks of hangers 14. At the upper end of the drive housing 37 is a chain guide 42 that is configured to retain a wear strip 43, on top of which the chain rides (FIG. 6). The housing 37 is connected to the upper mounting bracket 32 by a number of spaced apart support brackets 34 that are provided with an offset from the side of the rail (FIG. 5) so as not to impede the passage of the hangers 14 from the load rail 16 onto or along the powered storage rail.

The drive chain 40 is driven by a pulley that is driven by the motor 44 connected to a standard gear reduction unit 46. The motor 44 is connected to the upper mounting bracket via a mount 48. The motor 44 acts to turn the chain 40 in a direction 12 that moves the upper surface of the chain 40 from the infeed end (i.e., the load rail 16) to the output or "off-load" end, subject to the control provided by the control unit 20.

At the off-load end of the powered storage rail is a drop-off pipe 19 that is set at an angle with respect to the drive assembly 36, so that when a hanger is transported to the extremity of the drive chain at this end of the apparatus, it falls under the influence of gravity down the drop-off pipe 19 to an output rail 18. The output rail 18 is in the form of a hollow tube along at least a portion of its length, and provides a path for the gravity-fed transport of the hangers to the hanger metering assembly 60 (see FIGS. 3 and 4).

Referring now to FIGS. 1, 4, 8, and 9, the hanger metering assembly 60 is located along the output rail 18, and provides control over the continued motion of the hangers, as well as a queue for the hangers. The hanger metering assembly 60 is mounted between the upper mounting bracket 32 and the output rail 18 via a mounting bracket 62. As hangers approach the hanger metering assembly, they first encounter a hanger guide bracket 69, which helps prevent the hangers from becoming entangled with one another as they approach the hanger metering assembly 60.

A segment of the output rail 18 passing through the hanger metering assembly 60 is provided with a cut-out slot portion 74. Within the tubular output rail 18 is a metering cam housing 76, a pivoting spring-loaded cam 78, and a cam pin 90. A spring 79, located within the tubular output rail 18, urges the upper portion of the cam out through the slot 74 so that it presents a cam stop surface 80 that prevents the further movement of any hangers along the output rail 18 past this point.

In order for a hanger to continue its gravity-fed movement down the output rail 18, the cam 78 must be pressed back into the interior of the output rail. This function is provided by a pneumatically driven actuator cylinder 68. The hanger metering assembly 60 utilizes a standard pressure regulator 65 and a solenoid 66 (which is under the control of a CPU or other logic control system) to drive the pneumatic actuating cylinder 68 and its actuating tip 70 against the cam 78 whenever the solenoid 66 is triggered. The resulting movement of the actuating cylinder tip 70 pushes against the cam surface, driving it and the stop surface 80 back into the interior of the rail where the cam 78 cannot impede the further movement of hangers.

At this point, the first hanger in the queue is free to advance past the location of the stop surface towards the now extended cylinder actuator tip 70. The actuator tip 70 is then quickly retracted by the actuating cylinder 68 to its initial position. This both permits the continued advance of the single hanger through the hanger metering device towards the second conveyor, and permits the cam 78, acting under the return force supplied by the cam return spring 79, to re-establish its initial hanger-blocking position as it again protrudes through the cut-out. The size of the cam 78, the strength of the cam return spring 79, and the speed of the actuator are such that no more than one hanger can move past the cam with each activation of the solenoid 66. Further to this end, the distance between the actuator tip 70 and the cam stop surface 80 is approximately equal to the thickness of a single hanger.

Control over the loading of garments onto the powered storage rial is facilitated by sensor information provided from several locations. When hangers 14 are transferred from a first conveyor to the powered storage rail via the load rail 16, they slide down the rail 16 under the influence of gravity past a photoelectric sensor 35, which is linked to the control unit 20 (see FIG. 1), and onto the front end of the powered storage rail. The photoelectric sensor 35 is located in close proximity to the load rail 16 to detect hangers as they pass the sensor. When a hanger passes the photoelectric sensor 35, a signal is sent to the control unit 20. Any type of sensor capable of generating a signal in response to the passage of a hanger may be used here. For example, the photoelectric sensor employed may be of the diffuse reflective type that emits a beam of infrared light. When an object passes through the beam, infrared light is reflected back into the sensor, switching a solid state relay within the sensor and sending a signal to the control unit 20.

Figure 10:
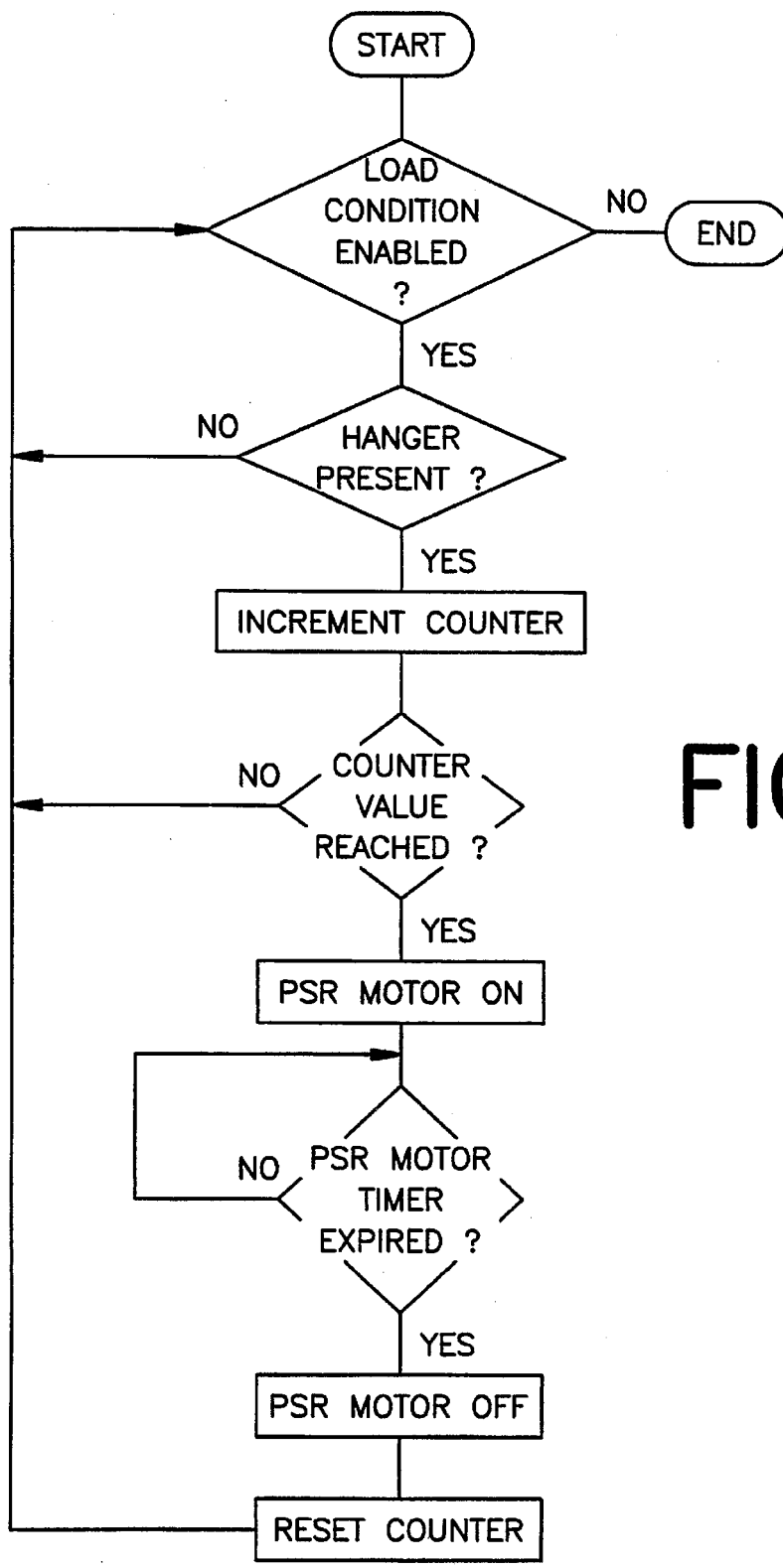
FIG. 10 is a flow chart illustrating one logical form by which the powered storage rail is loaded with articles from a first conveyor.

Referring to FIG. 10, the control unit 20 responds to the sensor input by incrementing a counter, and switching the drive motor 44 on for a short period of time (using a timer), typically just long enough to advance the roller chain 40 one link (for example, approximately one-half inch). When the timer expires, the control unit 20 switches off the motor. The distance that the chain is advanced is also a function of the type of garment fed onto the rail, as some types of garments (e.g., coats) are thicker and hence may require more space along the chain than other types of garments, such as shirts. (Information identifying the garment type can be contained in bar codes on the garments, for example, and can be loaded into the control unit.) Whatever the garment type, the chain is incrementally advanced in this manner every time a hanger passes the photoelectric sensor, which efficiently spaces hangers 14 along the powered storage rail and avoids their bunching-up on one another.

(When, as is usually the case, it is desired to space the garments evenly along the rail so that they are separated from one another, the target value of the counter shown in FIG. 10 is set to 1, and for each hanger the chain advances enough to evenly space the garments. However, there may be some applications in which it is desirable to provide the garments in bunched-up clusters along the rail. In that case, the target value of the counter is set by the system to a number greater than 1, and several garments are loaded onto the chain 40 at essentially the same location of the chain before the chain is advanced. In the remainder of this discussion, it is assumed that the counter target value is set to 1.)

The incremental advance of the chain continues for as long as hangers are fed to the powered storage rail from the first conveyor until the powered storage rail has reached a desired carrying capacity. Once the powered storage rail is "full" (depending on the operation of the system, the rail may be deemed "full" when at least one quarter of the available chain links, for example, are carrying a hanger), the control unit ceases to respond to the passage of hangers past the photoelectric sensor 35 with further advances of the roller chain 40. At this point, the powered storage rail itself acts as a buffer for holding hangers in transit to the second conveyor.

Figure 11:
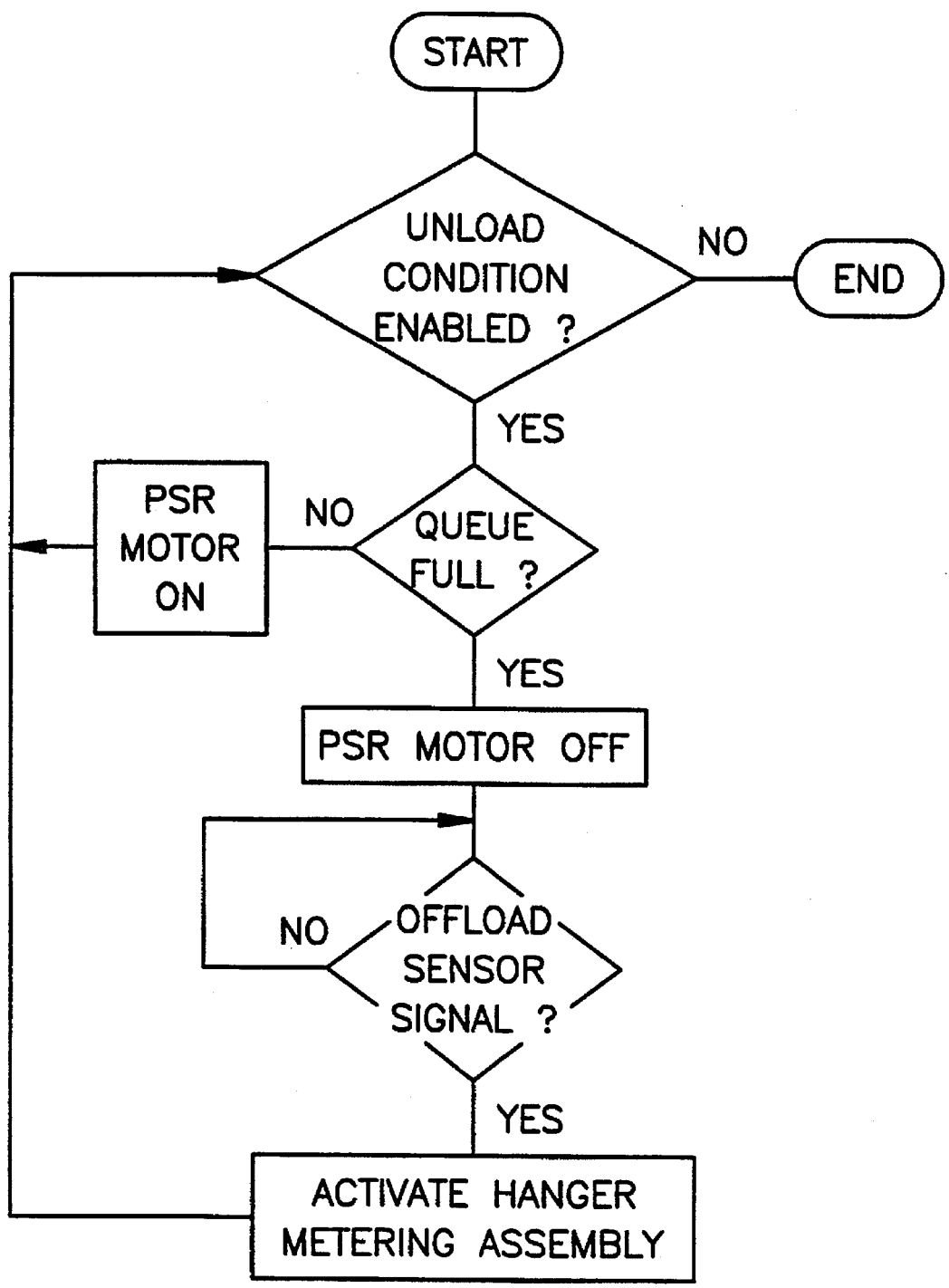
FIG. 11 is a flow chart illustrating the logic by which the powered storage rail is unloaded via the hanger metering device.

The manner in which the powered storage rail is unloaded is described in FIG. 11. When the control unit receives an indication that the hangers on the powered storage rail are to be transferred to the second conveyor, the motor 44 is switched on and the hangers are conveyed to the outfeed end of the powered storage rail for unloading as follows. When hangers reach the end of the powered storage rail, the hangers fall off the powered storage rail in order down the drop-off 19 and then slide down the tubular output rail 18 to the hanger metering assembly 60, where another photoelectric sensor 84 (see FIG. 8) is located. The sensor sends a brief signal whenever a garment passes in front of it. The hangers continue to slide down the output rail until the first hanger contacts the stop surface 80 of cam 78. This defines the front of a queue 86 of hangers, the maximum desired length of which is determined by system requirements. Typically, this queue 86 will contain 4–7 hangers. The queue is considered to be full when the garments have backed up along the rail 18 to the point that they are in front of sensor 84. At this point, sensor 84 will send a continuous signal to the control unit 20, indicating that the queue is full, and shortly thereafter the control unit 20 turns off motor 44, halting the further movement of the roller chain 40 so that the hangers cease to unload off the roller chain 40.

The control unit 20 receives signals (the "off-load sensor signal" of FIG. 11) from the downstream conveyor indicating whether a suitable opening exists on the downstream conveyor for the hanger at the front of the queue 86 to occupy. When such an appropriate spot is found, the control unit activates the solenoid 66 to activate the hanger metering assembly 60, which permits one and only one hanger to leave the queue 86 and proceed towards the downstream conveyor. Hangers thereby are metered out to the downstream conveyor one at a time, so that they are matched up with suitable locations within the downstream conveyor. As the queue empties, the photoelectric sensor 84 switches off, which is a signal to the control unit to turn on the powered storage rail motor until the queue 86 is again full, at which time the powered storage rail motor is again shut off. This sequence repeats itself until there are no more hangers on the powered storage rail or the system is taken out of unload mode.

What is claimed is:

1. An apparatus for conveying articles from a first location to a second location, comprising:

at least two pulleys;

a housing, said pulleys being mounted within the housing;

a roller chain entrained about and having a drive connection with the pulleys in the housing, the roller chain and housing having a first, infeed end and a second, outfeed end;

means for advancing the chain in a controlled manner;

a load rail having an end that is in proximity to the roller chain, the load rail being adapted for receiving articles from a source and conveying the articles to the roller chain;

a sensor supported in proximity to the load rail, wherein with passage of the article past the sensor, the sensor senses the article and generates a signal indicative thereof;

a counter adjusted when each signal generated by the sensor is received, said counter generating a counter signal when said counter equals a predetermined target value; and a control system for receiving the counter signal and advancing the chain a set distance in dependence on the counter signal.

2. An apparatus as defined in claim 1, wherein the articles are hooked members.

3. An apparatus as defined in claim 2, wherein the roller chain is comprised of links that are shaped to receive the hooked portion of a hooked member.

4. An apparatus as defined in claim 3, wherein the source of articles is a conveyor.

5. An apparatus as defined in claim 4, wherein the load rail is set at an angle with respect to the housing, so that articles fall under the influence of gravity down the load rail towards the chain.

6. An apparatus as defined in claim 5, wherein the hooked members are hangers, and the hangers bear garments.

7. An apparatus as defined in claim 6, further comprising a computer, wherein identifying information regarding each garment is loaded into the computer.

8. An apparatus as defined in claim 7, wherein the location of the garments is tracked by the computer using an additional sensor.

9. A powered storage rail for transporting articles, comprising:

a conveyor having an infeed end and an outfeed end, the conveyor being driven by a motor;

an infeed rail for receiving articles from a source and guiding the articles to the motor driven conveyor;

a first sensor in proximity to the infeed rail to sense the passage of articles along the infeed rail;

a downwardly extending off-load rail located at the outfeed end of the motor driven conveyor, the off-load rail comprising a second sensor for determining the stationary presence of a garment along the off-load rail; and a control unit, the control unit being configured to power the motor on and off in response to signals provided by at least one of the first and second sensors;

wherein articles are gravity fed down the infeed rail to the motor driven conveyor for transport along the conveyor towards the outfeed end of the conveyor by the intermittent activation of the motor, where the articles are transferred to the off-load rail, along which the articles move under the action of gravity.

10. A rail as defined in claim 9, wherein the articles are hooked members.

11. A rail as defined in claim 10, further comprising a roller chain including links that are shaped to receive hooked portions of the hooked members.

12. A rail as defined in claim 11, wherein the source of articles is a conveyor.

13. A rail as defined in claim 12, wherein the infeed rail is set at an angle with respect to a housing, so that articles fall under the influence of gravity down the infeed rail towards the chain.

14. A rail as defined in claim 10, wherein the hooked members are hangers, and the hangers bear garments.

15. A rail as defined in claim 9, wherein the conveyor comprises a housing, a pair of pulleys, a chain entrained about the pulleys, and wherein a motor his a drive arrangement with the chain.

16. A rail as defined in claim 9, wherein located along a portion of the off-load rail is a hanger metering unit comprising:

a tubular member having a cut-out portion;

a spring-loaded cam housed within the tubular member and protruding therefrom through the cut-out portion, the cam defining a stop surface along a periphery of the tubular member so as to prevent further motion of articles along the tubular member;

an actuating cylinder having a piston and an actuating tip connected to the piston that is located above the protruding portion of the cam; and a trigger for actuating the actuating cylinder in response to a signal provided by the control unit, wherein upon actuation of the actuating cylinder, the actuating tip is extended down so that it forces the portion of the cam which protrudes, through the cut-out portion back into the tubular member to the extent that the cam no longer serves to halt the movement of articles.

17. A rail as defined in claim 16, wherein the second sensor is located near the actuating tip of the actuating cylinder so that it detects the presence of articles as they move towards the actuating tip.

18. A rail as defined in claim 9, wherein the second sensor is of the diffuse reflective type, and provides a constant "on" signal whenever articles are at rest in front of the second sensor, the "on" signal serving to direct the control unit to turn the motor off.

19. A rail as defined in claim 9, wherein the rail defines a buffer for the storage of articles.

20. A method of transporting articles from a first conveyor to a second conveyor, comprising the steps of:

transporting articles from the first conveyor down a load rail along which is located a first sensor for detecting the passage of articles;

advancing the motor driven chain of a storage rail so as to receive at least one article from the load rail without interfering with additional articles on the chain and loading the article onto the chain;

loading the additional articles onto the chain and advancing the chain until the storage rail is deemed full;

off-loading articles from the storage rail by advancing the chain, causing articles at an outfeed end of the storage rail to fall down an off-load rail;

establishing a queue of articles along the off-load rail;

singly releasing articles from the queue along the off-load rail when an appropriate place for the article is available on the second conveyor downstream from the off-load rail.

21. A method as defined in claim 20, wherein a second sensor on the off-load rail is utilized to determine when the queue along the off-load rail is at its maximum desired size, at which time the advancing of the chain of the storage rail is ceased.

22. A method as defined in claim 21, wherein when the queue falls below a threshold size, the chain of the storage rail is again advanced so as to off-load articles from the storage rail and thereby replenish the queue.

23. A method as defined in claim 20, further comprising the step of:

recording identifying information for each article in a database, wherein the advancement of the motor driven chain is in dependance upon the identifying information recorded for a given article as that being loaded onto the chain.

24. A method as defined in claim 21, wherein a length of the queue is determined by a distance separating the second sensor from a front of the queue.

25. An apparatus for conveying articles from a first location to a second location, comprising:

a conveyor driven by a motor, said conveyor having an in-feed end and an off-load end;

a load rail having an end that is in proximity to the in-feed end, the load rail being adapted for receiving articles from a source and conveying the articles to the conveyor;

a sensor supported in proximity to the load rail, the sensor sensing an article passing the sensor and generating a signal indicative thereof; a counter adjusted when each signal generated by the sensor is received, said counter generating a counter signal when said counter equals a predetermined target value; and a controller for receiving the counter signal and for advancing the conveyor as a function of the counter signal.

* * * * *